United States Patent
Kondo

(10) Patent No.: US 10,482,166 B2
(45) Date of Patent: Nov. 19, 2019

(54) IMAGE FORMING APPARATUS THAT STORES A PLURALITY OF ITEMS OF DECOMPRESSED CONTENTS CORRESPONDING TO SOME OF A PLURALITY OF LANGUAGES IN ACCORDANCE WITH INFORMATION RELATED TO A REGION OF THE WORLD, METHOD OF CONTROLLING THE SAME, AND STORAGE MEDIUM

(71) Applicant: CANON KABUSHIKI KAISHA, Tokyo (JP)

(72) Inventor: Yuichi Kondo, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/291,703

(22) Filed: Oct. 12, 2016

(65) Prior Publication Data
US 2017/0116163 A1    Apr. 27, 2017

(30) Foreign Application Priority Data
Oct. 22, 2015  (JP) ................. 2015-208290

(51) Int. Cl.
*G06F 17/00* (2019.01)
*G06F 17/22* (2006.01)
(Continued)

(52) U.S. Cl.
CPC .......... *G06F 17/2247* (2013.01); *G06F 9/454* (2018.02); *G06F 17/28* (2013.01);
(Continued)

(58) Field of Classification Search
CPC .... G06F 17/2247; G06F 9/4448; G06F 17/28; G06F 17/289; G06F 17/29;
(Continued)

(56) References Cited

U.S. PATENT DOCUMENTS 5,155,848 A * 10/1992 Aoshima ................. G06F 17/24
                                                         715/272
5,359,365 A * 10/1994 Enokida ............... H04N 5/9264
                                                         348/390.1
(Continued)

FOREIGN PATENT DOCUMENTS

JP    2002-007095 A    1/2002
JP    2005196397 A     7/2005
(Continued)

OTHER PUBLICATIONS

Japanese Office Action issued in corresponding Japanese Application No. 2015208290 dated Jul. 26, 2019.

*Primary Examiner* — Jason T Edwards
(74) *Attorney, Agent, or Firm* — Venable LLP

(57) ABSTRACT

The present invention provides an image forming apparatus, and a method for controlling the same. Display data corresponding to a plurality of languages for displaying by a web browser is stored in advance in a first storage unit in a compressed manner, and display data in a language corresponding to a place of destination information of the image forming apparatus is read out from the display data corresponding to the plurality of languages stored in the first storage unit, expanded, and developed to a second storage unit. Web page data is generated using the display data, corresponding to a language designated by a client, developed in the second storage unit.

20 Claims, 11 Drawing Sheets

(51) Int. Cl.
*G06F 17/28* (2006.01)
*H04N 1/00* (2006.01)
*G06F 9/451* (2018.01)

(52) U.S. Cl.
CPC ....... *G06F 17/289* (2013.01); *H04N 1/00464* (2013.01); *H04N 1/00498* (2013.01)

(58) Field of Classification Search
CPC ........... G06F 17/2854; G06F 17/30867; G06F 12/0246; G06F 12/7203; G06F 9/454; H04N 1/00464; H04N 1/00498
USPC ......................................................... 715/273
See application file for complete search history.

(56) References Cited

U.S. PATENT DOCUMENTS

| | | | | |
|---|---|---|---|---|
| 5,829,044 A | * | 10/1998 | Sono | G11B 27/031 707/E17.028 |
| 6,623,529 B1 | * | 9/2003 | Lakritz | G06F 17/2288 707/E17.109 |
| 9,116,651 B2 | | 8/2015 | Ishii | 715/760 |
| 9,262,405 B1 | * | 2/2016 | Baliga | G06Q 30/0255 |
| 2004/0088155 A1 | * | 5/2004 | Kerr | G06F 9/454 704/8 |
| 2006/0136907 A1 | * | 6/2006 | Bennett | G06F 8/61 717/174 |
| 2007/0005188 A1 | * | 1/2007 | Johnson | G06F 17/3087 700/245 |
| 2009/0198789 A1 | * | 8/2009 | Young | A63F 13/10 709/213 |
| 2009/0292375 A1 | * | 11/2009 | Thompson | G08C 17/00 700/81 |
| 2011/0185142 A1 | * | 7/2011 | Nishida | G06F 1/3221 711/165 |
| 2012/0200895 A1 | * | 8/2012 | Haga | G06K 15/1861 358/1.16 |
| 2014/0059272 A1 | * | 2/2014 | Wang | G06F 12/0246 711/103 |
| 2014/0280704 A1 | * | 9/2014 | Ongg | H04L 67/10 709/217 |
| 2016/0044127 A1 | * | 2/2016 | Filner | H04L 67/2847 709/213 |
| 2016/0150048 A1 | * | 5/2016 | Kalis | H04L 67/2847 709/203 |
| 2016/0253105 A1 | * | 9/2016 | Chang | G06F 3/0608 711/154 |
| 2016/0295299 A1 | * | 10/2016 | Kang | H04N 21/812 |
| 2018/0293091 A1 | * | 10/2018 | Sawatari | G06F 3/0482 |

FOREIGN PATENT DOCUMENTS

| | | |
|---|---|---|
| JP | 2009075677 A | 4/2009 |
| JP | 2011-257945 A | 12/2011 |
| JP | 2014229139 A | 12/2014 |

* cited by examiner

FIG. 2

| PLACE OF DESTINATION | SUPPORTED Web BROWSER DISPLAY LANGUAGES | NO. OF LANGUAGES |
|---|---|---|
| JAPAN | JAPANESE * / ENGLISH | 2 |
| NORTH AMERICA | ENGLISH * / FRENCH / SPANISH / PORTUGUESE | 4 |
| EUROPE | ENGLISH * / FRENCH / SPANISH / GERMAN / ITALIAN / DUTCH / FINNISH / PORTUGUESE / NORWEGIAN / SWEDISH / DANISH / CZECH / HUNGARIAN / RUSSIAN / POLISH / TURKISH | 16 |
| ASIA/OCEANIA | ENGLISH * / FRENCH / SPANISH / PORTUGUESE / JAPANESE / SIMPLIFIED CHINESE / TRADITIONAL CHINESE / KOREAN | 8 |
| CHINA | SIMPLIFIED CHINESE * / TRADITIONAL CHINESE / ENGLISH / JAPANESE | 4 |
| KOREA | KOREAN * / ENGLISH | 2 |
| TAIWAN | TRADITIONAL CHINESE * / SIMPLIFIED CHINESE / ENGLISH / JAPANESE | 4 |

| JAPANESE | TOTAL SIZE [7600 BYTES] |
|---|---|
| MESSAGE ID | MESSAGE |
| 1 | 管理者モード |
| 2 | システム管理部門ID |
| 3 | 一般ユーザモード |
| 4 | ユーザ名 |
| 5 | ログイン |
| 6 | デバイス状況 |
| 7 | プリンタ |
| 8 | 印刷できます。 |
| 9 | スキャナ |
| 10 | 読み込みできます。 |
| 11 | ログアウト |
| : | : |
| : | : |
| : | : |

| ENGLISH | TOTAL SIZE [81400 BYTES] |
|---|---|
| MESSAGE ID | MESSAGE |
| 1 | System Manager Mode |
| 2 | System Manager PIN |
| 3 | End-User Mode |
| 4 | User Name |
| 5 | Log In |
| 6 | Device Status |
| 7 | Printer: |
| 8 | Ready to print |
| 9 | Scanner |
| 10 | Ready to scan |
| 11 | Log Out |
| : | : |
| : | : |
| : | : |

ADMINISTRATOR MODE

ADMINISTRATOR ID

ADMINISTRATOR PIN

GENERAL USER MODE

USER NAME :

LOG IN

FIG. 6B

LOG OUT

DEVICE STATUS

PRINTER: READY TO PRINT.

SCANNER: READY TO SCAN.

FIG. 7

SCREEN 1 ~701

| PART | COORDINATES |
|---|---|
| MESSAGE ID-1 | (5, 5) |
| MESSAGE ID-2 | (10, 15) |
| MESSAGE ID-3 | (10, 25) |
| MESSAGE ID-4 | (5, 35) |
| MESSAGE ID-5 | (10, 45) |
| MESSAGE ID-6 | (35, 55) |
| BUTTON | (35, 55) |
| ⋮ | ⋮ |
| ⋮ | ⋮ |

SCREEN 2 ~702

| PART | COORDINATES |
|---|---|
| MESSAGE ID-7 | (5, 5) |
| MESSAGE ID-8 | (10, 15) |
| MESSAGE ID-9 | (35, 15) |
| MESSAGE ID-10 | (10, 25) |
| MESSAGE ID-11 | (35, 25) |
| MESSAGE ID-12 | (70, 1) |
| BUTTON | (70, 1) |
| ⋮ | ⋮ |
| ⋮ | ⋮ |
| ⋮ | ⋮ |

IMAGE FORMING APPARATUS THAT STORES A PLURALITY OF ITEMS OF DECOMPRESSED CONTENTS CORRESPONDING TO SOME OF A PLURALITY OF LANGUAGES IN ACCORDANCE WITH INFORMATION RELATED TO A REGION OF THE WORLD, METHOD OF CONTROLLING THE SAME, AND STORAGE MEDIUM

BACKGROUND OF THE INVENTION

Field of the Invention

The present invention relates to an image forming apparatus, a method of controlling the same, and a storage medium.

Description of the Related Art

Conventionally, image processing apparatuses that include a web server function are known. For example, Japanese Patent Laid-Open No. 2002-007095 discloses that an image processing apparatus can generate information regarding its job statuses, setting information, and the like as a web page, and transmit that web page to a client external apparatus that is connected thereto via a network. Accordingly, a user of the client can browse information regarding the image processing apparatus using a web browser.

Also, Japanese Patent Laid-Open No. 2011-257945 discloses that when a screen displayed on a display unit of an information transmission terminal is to be displayed in a web browser, the screen displayed on the display unit is displayed in a state that conforms to the language used in the web browser.

In order to be able to use a small-capacity ROM in conventional image processing apparatuses that include a web server function, message data used for web browser display is stored in the ROM in a compressed manner. The image processing apparatus also stores the web browser display language setting in the ROM, and, when the power is turned on or when there is a change to the web browser display language setting, message data in the set language is obtained from the ROM, expanded, stored in a RAM, and then displayed. In this way, it is possible to swiftly switch the language of the web page that is displayed by the client web browser.

However, in the case where multiple clients display message data in different languages in the web browser, each language switch makes it necessary for the web browser display language setting to be changed in the image processing apparatus, and for message data in the newly set language to be obtained from the ROM and displayed. Also, when compressed message data is expanded and stored in the RAM, the amount of time required for the expansion processing depends on the amount of message data for the language. Accordingly, there has been an issue in that it is difficult to swiftly generate web pages in accordance with web page display requests for various languages from clients.

SUMMARY OF THE INVENTION

An aspect of the present invention is to eliminate the above-mentioned problems with the conventional techniques.

A feature of the present invention is to provide a technique for swiftly generating display data in accordance with a display request by developing, to a memory in advance, data in a language that corresponds to a place of destination based on information indicating the place of destination of an information processing apparatus.

According to a first aspect of the present invention, there is provided an image forming apparatus, comprising: a first storage unit configured to store display data corresponding to a plurality of languages for displaying by a web browser in a compressed manner; a developing unit configured to obtain, from the display data corresponding to the plurality of languages stored in the first storage unit, display data in a language that corresponds to a place of destination information of the image forming when the image forming apparatus is powered on, and expand the display data in the language to develop in a second storage unit; and a generation unit configured to generate web page data using the display data, corresponding to a language designated by a client, developed in the second storage unit.

According to a second aspect of the present invention, there is provided an image forming apparatus, comprising: a first storage unit configured to store display data corresponding to a plurality of languages for displaying by a web browser in a compressed manner; a first developing unit configured to, when the image forming apparatus is powered on, obtain, from the first storage unit, display data in a default language that corresponds to place of destination information of the image forming apparatus, and expand the display data to develop in a second storage unit; a determination unit configured to determine whether or not display data corresponding to a language designated by a client is developed in the second storage unit; a second developing unit configured to, if the determination unit determines that the display data corresponding to the language designated by the client is not developed in the second storage unit, obtain, from the first storage unit, the display data corresponding to the language designated by the client, and expand the display data corresponding to the language designated by the client to develop in the second storage unit; and a generation unit configured to generate web page data using the display data developed in the second storage unit if the determination unit determines that the display data corresponding to the language designated by the client is developed in the second storage unit, and cause the second developing unit to develop the display data corresponding to the language designated by the client and generate web page data using the display data developed by the second developing unit if the determination unit determines that the display data corresponding to the language designated by the client is not developed in the second storage unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a diagram for describing web browser display support languages stored by the image forming apparatus in accordance with shipping destinations (places of destination) to which the image forming apparatus according to the first embodiment of the present invention can be shipped.

FIG. 3 is a diagram for describing an example of a configuration of message data for web browser display in Japanese and English, which is stored by the image forming apparatus according to the first embodiment.

FIG. 5 is a flowchart for describing processing in which the image forming apparatus according to the first embodiment of the present invention develops message data for web browser display to a RAM when the power is turned on.

FIGS. 6A and 6B are diagrams showing examples of web pages that have been transmitted from the image forming apparatus according to the first embodiment to a PC, and are displayed by the web browser of the PC.

FIG. 7 is a diagram illustrating an example of a data configuration of web page screen information stored in the image forming apparatus according to the first embodiment.

FIG. 10 is a flowchart for describing processing in which the image forming apparatus according to the second embodiment of the present invention develops message data for web browser display to a RAM when the power is turned on.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that although the following describes embodiments of an information processing apparatus of the present invention by way of example of an image forming apparatus such as a multi-function peripheral, the information processing apparatus of the present invention is not limited to such an image forming apparatus.

First Embodiment

Figure 1:
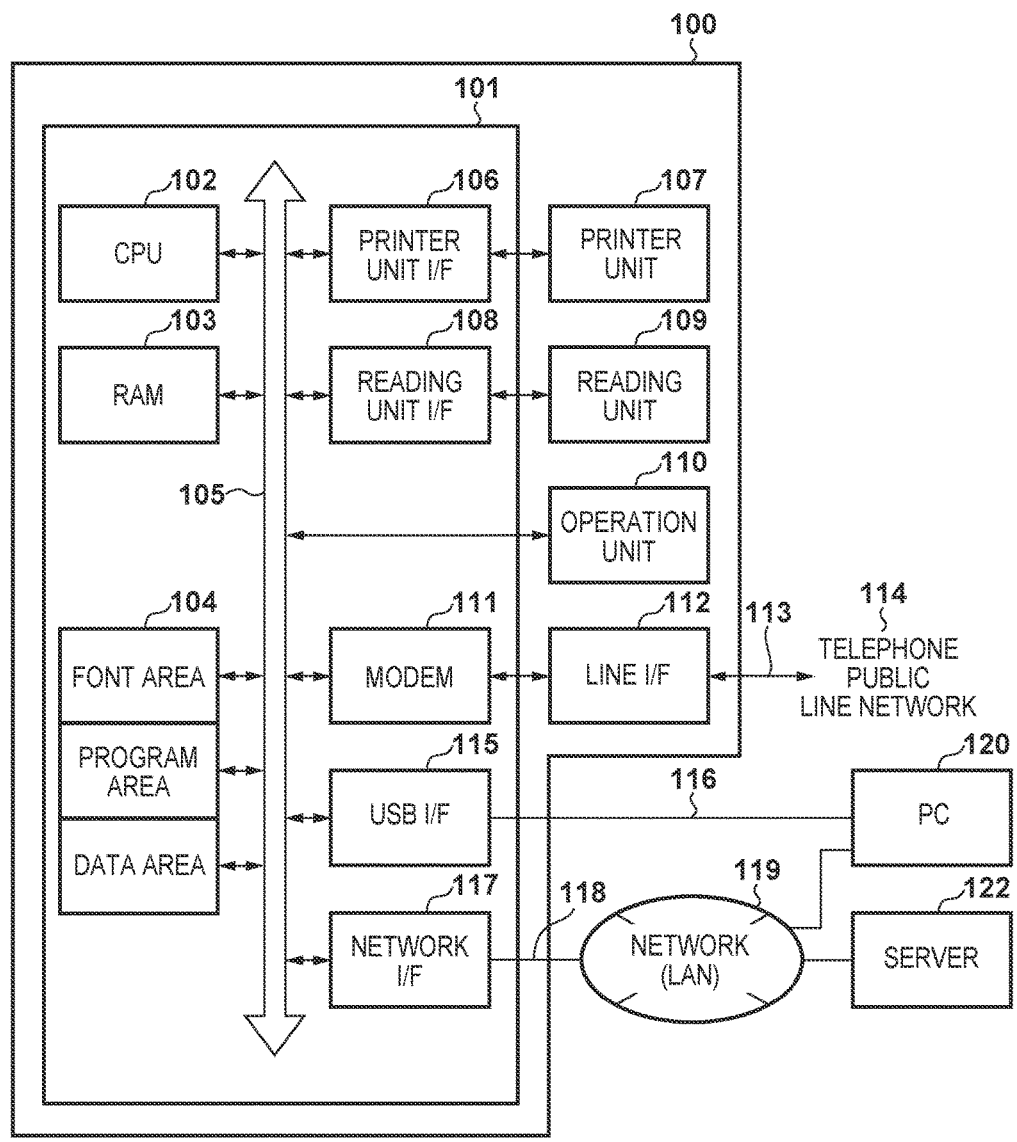
FIG. 1 is a block diagram for describing a hardware configuration of an image forming apparatus according to a first embodiment of the present invention.

FIG. 1 is a block diagram for describing the hardware configuration of an image forming apparatus 100 according to a first embodiment of the present invention. In this figure, the arrows connecting units indicate the flow of data or instructions.

The image forming apparatus 100 has a printer unit 107, a reading unit 109, an operation unit 110, a line I/F (interface) 112, and a control unit 101 that controls these members. The control unit 101 includes a CPU 102, a RAM 103, a non-volatile memory 104, a printer unit I/F 106, a reading unit I/F 108, a modem 111, a USB I/F 115, and a network I/F 117, and these members are connected to each other via a system bus 105.

The CPU 102 performs overall control of the members that are connected to the CPU 102 via the system bus 105, in accordance with an OS and control programs that are stored in a program area of the non-volatile memory 104. Note that the OS, the control programs, and the like stored in the program area of the non-volatile memory 104 are deployed to the RAM 103 and executed by the CPU 102. Alternatively, the aforementioned control programs, OS, and the like may be stored in a compressed state or uncompressed state in a hard disk drive (HDD) that is not shown, and then developed to the RAM 103 and executed. The network I/F 117 performs processing for communication with a host computer (PC) 120 and a server 121 via a network (LAN) 119. The network I/F 117 and the network 119 are connected by a communication cable such as a LAN cable 118. Also, the PC 120 may be connected to the USB I/F 115 via a USB cable 116. The modem 111 is for connecting to a telephone public line network 114 via the line I/F 112, and performs communication with other data communication apparatuses, fax machines, telephones, and the like (not shown) that are connected to the telephone public line network 114. The line I/F 112 and the telephone public line network 114 are generally connected by a telephone line 113 or the like. Note that the RAM 103 is a volatile memory that can be accessed at a higher speed than the non-volatile memory 104.

The printer unit I/F 106 plays the role of an interface for outputting image signals to the printer unit 107 (printer engine) and receiving the status of the printer unit 107. The reading unit I/F 108 plays the role of an interface for receiving image signals obtained by the reading unit 109 (scanner engine) reading an original, and receiving the status of the reading unit 109. The CPU 102 processes image signals received via the reading unit I/F 108, and outputs the result as image signals for recording to the printer unit 107 via the printer unit I/F 106. The CPU 102 also displays characters and symbols on the display unit of the operation unit 110 using font information that is stored in a font area of the non-volatile memory 104. The CPU 102 also accepts instruction information given by a user operation performed via the operation unit 110. Also, apparatus information regarding the image forming apparatus 100, user telephone directory information, and the like are stored in a data area of the non-volatile memory 104 by the CPU 102, are read out by the CPU 102 as necessary, and are updated as necessary. Note that although FIG. 1 shows a configuration in which the reading unit 109 and the printer unit 107 are included in the image forming apparatus 100, a configuration is possible in which either or both of them are outside of the image forming apparatus 100.

When the CPU 102 receives a request for display of apparatus information regarding the image processing apparatus 100 from a web browser provided in the PC 120, the CPU 102 generates web page data that includes the requested apparatus information, and transmits the web page data to the PC 120. The PC 120 can thus cause the web browser to display the apparatus information regarding the image processing apparatus 100 that was transmitted by the image processing apparatus 100.

FIG. 2 is a diagram for describing web browser display support languages stored by the image forming apparatus 100 in accordance with shipping destinations (places of destination) to which the image forming apparatus 100 according to the first embodiment of the present invention can be shipped. Note that this table of web browser support languages is stored in the program area of the non-volatile memory 104 of the image forming apparatus 100. Note also that "*" in FIG. 2 indicates the language that is set as the default for the corresponding place of destination.

Numeral 201 denotes the web browser language that corresponds to products destined for Japan, that is to say that is supported by products destined for Japan, and the two languages Japanese and English are included in this case. Numeral 202 denotes the web browser language that is supported by products destined for North America, and the four languages English, French, Spanish, and Portuguese are included in this case. Numeral 203 denotes the web browser language that is supported by products destined for Europe. Products destined for Europe include 16 languages, such as English, French, Spanish, German, Italian, Dutch, Finnish, Portuguese, Norwegian, Swedish, Danish, Czech, and Hungarian. Numeral 204 denotes the web browser language that is supported by products destined for Asia and Oceania, and the eight languages English, French, Spanish, Portuguese, Japanese, Simplified Chinese, Traditional Chinese, and Korean are included in this case. Numeral 205 denotes the web browser language that is supported by products destined for China, and the four languages Simplified Chinese, Traditional Chinese, English, and Japanese are included in this case. Numeral 206 denotes the web browser language that is supported by products destined for Korea, and the two languages Korean and English are included in this case. Lastly, numeral 207 denotes the web browser language that is supported by products destined for Taiwan, and the four languages Simplified Chinese, Traditional Chinese, English, and Japanese are included in this case.

FIG. 3 is a diagram for describing an example of the configuration of message data for web browser display in Japanese and English, which is stored by the image forming apparatus 100 according to the first embodiment. Note that this message data is registered in the program area of the non-volatile memory 104 of the image forming apparatus 100.

Message IDs and message content are stored in association with each other in a Japanese message table for web browser display. For example, the message for the message ID "1" is 管理者モード ("System Manager Mode"). Also, the total data amount for these Japanese messages is 76000 bytes. Message IDs and message content are similarly stored in association with each other in an English message table for web browser display. The total data amount for these English messages is 81400 bytes. For example, "System Manager Mode" is stored as the message for the message ID "1".

Figure 4:
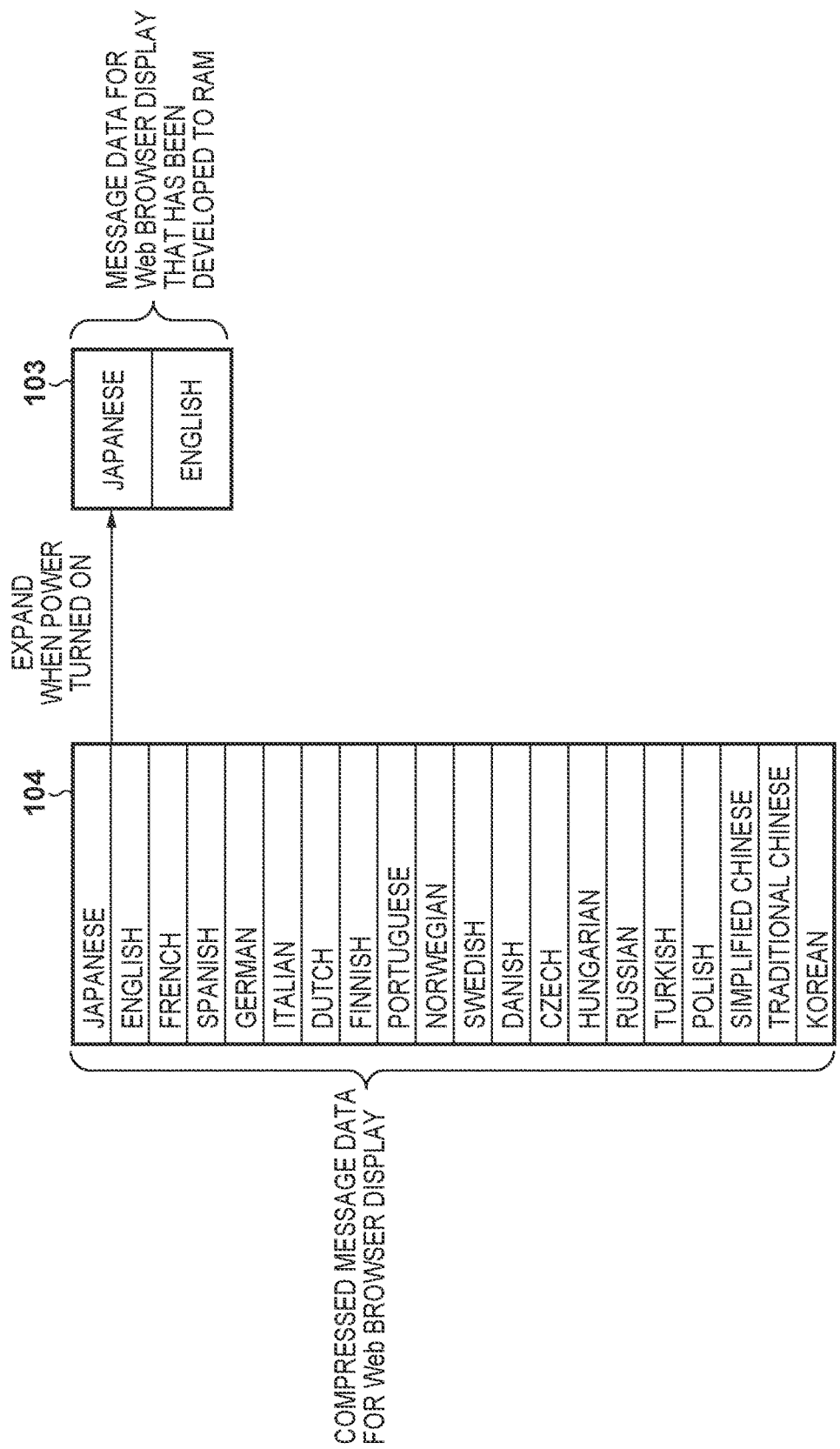
FIG. 4 is a diagram for describing the expansion of message data stored in a non-volatile memory of the image forming apparatus according to the first embodiment.

FIG. 4 is a diagram for describing the expansion of message data stored in the non-volatile memory 104 of the image forming apparatus 100 according to the first embodiment.

Message data for web browser display is stored in a compressed manner in the non-volatile memory 104. When the power of the image forming apparatus 100 is turned on, the CPU 102 reads out the message data from the non-volatile memory 104, expands it, and then stores it in the RAM 103. This figure shows the case where Japan is the place of destination, and when the power is turned on, the CPU 102 expands the Japanese message data and the English message data, and stores the expanded data in the RAM 103.

Figure 5:
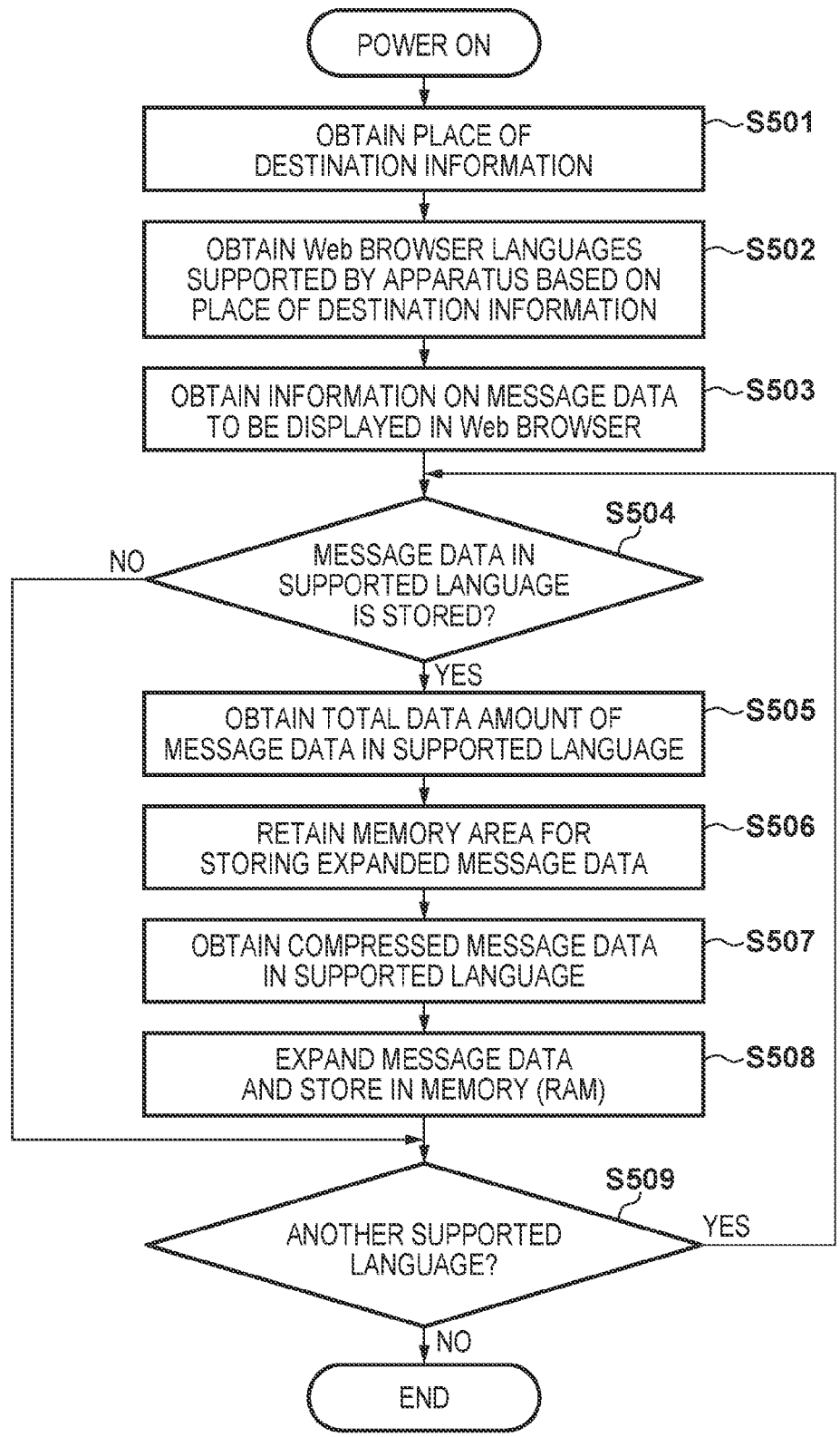

FIG. 5 is a flowchart for describing processing in which the image forming apparatus 100 according to the first embodiment of the present invention develops message data for web browser display to the RAM 103 when the power is turned on. Note that a program for executing this processing is stored in the program area of the non-volatile memory 104 and is deployed into the RAM 103 at the time of execution, and the CPU 102 achieves the processing shown in this flowchart by executing the deployed program.

This processing is started due to the power of the image forming apparatus 100 being turned on. First, in step S501, the CPU 102 reads out and obtains destination information that indicates the shipping destination of the image forming apparatus 100, which is stored in the data area of the non-volatile memory 104 of the image forming apparatus 100. The procedure then advances to step S502, in which the CPU 102 obtains the web browser languages that correspond to the place of destination information (are supported by apparatuses shipped to the place of destination) based on the obtained place of destination information. For example, in the case where the place of destination information indicates Japan, Japanese and English are obtained as shown in FIG. 2. The procedure then advances to step S503, in which the CPU 102 obtains information regarding message data that corresponds to Japanese and English from the message data for web browser display that is stored in the program area of the non-volatile memory 104. The procedure then advances to step S504, in which the CPU 102 determines whether or not message data in the supported languages (FIG. 3) is stored in the program area of the non-volatile memory 104. In the case of a determination that the message data is stored, the procedure advances to step S505, whereas in the case of a determination that the message data is not stored, the procedure advances to step S509.

In step S505, the CPU 102 obtains the total data amount of the message data in one of the supported languages. For example, in the case of Japanese, 76000 bytes is obtained. Next, the procedure advances to step S506, in which, based on the total data amount, the CPU 102 retains a memory area for expanding and storing the message data in the RAM 103. Next, the procedure advances to step S507, in which the CPU 102 reads out and obtains message data in the supported language, which is stored in a compressed manner in the program area of the non-volatile memory 104. The procedure then advances to step S508, in which the CPU 102 expands the obtained message data and stores it in the memory area that was retained in the RAM 103 in step S506. The procedure then advances to step S509, in which the CPU 102 determines whether or not there is another supported language, returns to step S504 if there is another supported language, and ends this processing if there is not another supported language.

Through the processing shown in this flowchart, when the power of the image forming apparatus 100 is turned on, message data in Web browser languages that correspond to the shipping destination of the image forming apparatus 100 are developed and stored to the RAM 103. Accordingly, even when a web page display request is received from a client, it is possible to swiftly generate web page data and transmit it to the client.

FIGS. 6A and 6B are diagrams showing examples of web pages that have been transmitted from the image forming apparatus 100 according to the first embodiment to the PC 120, and are displayed by the web browser of the PC 120. In FIGS. 6A and 6B, the web pages are displayed in English.

FIG. 6A shows an example of the display of a login screen displayed in the web browser of the PC 120. When the image processing apparatus 100 is accessed from the web browser of the PC 120, the log in screen web page is transmitted from the image forming apparatus 100 to the PC 120, and the screen shown in FIG. 6A, for example, is displayed by the web browser of the PC 120. The user of the PC 120 can log in to the image processing apparatus 100 in an administrator mode by inputting a system administrator ID and a system administrator PIN via this screen. Also, the user of the PC 120 can log in to the image processing apparatus 100 in a general user mode by inputting their username.

FIG. 6B shows an example of the display of a device status screen displayed by the web browser of the PC 120. When a device status display request is issued to the image processing apparatus 100 from the web browser of the PC 120, a device status screen web page is transmitted from the image forming apparatus 100 to the PC 120, and the screen shown in FIG. 6B, for example, is displayed by the web browser of the PC 120.

FIG. 7 is a diagram illustrating an example of a data configuration of web page screen information stored in the image forming apparatus 100 according to the first embodiment.

This web page screen information is stored in the program area of the non-volatile memory 104 of the image forming apparatus 100. This screen information includes message data parts, image data parts (not shown), button parts, coordinate information, and the like. Numeral 701 denotes screen information regarding the log in screen web page shown in FIG. 6A, and numeral 702 denotes screen information regarding the device status screen shown in FIG. 6B. The screen information regarding the device status screen includes message data parts, image data parts (not shown), button parts, coordinate information, apparatus information (not shown), and the like.

Figure 8:
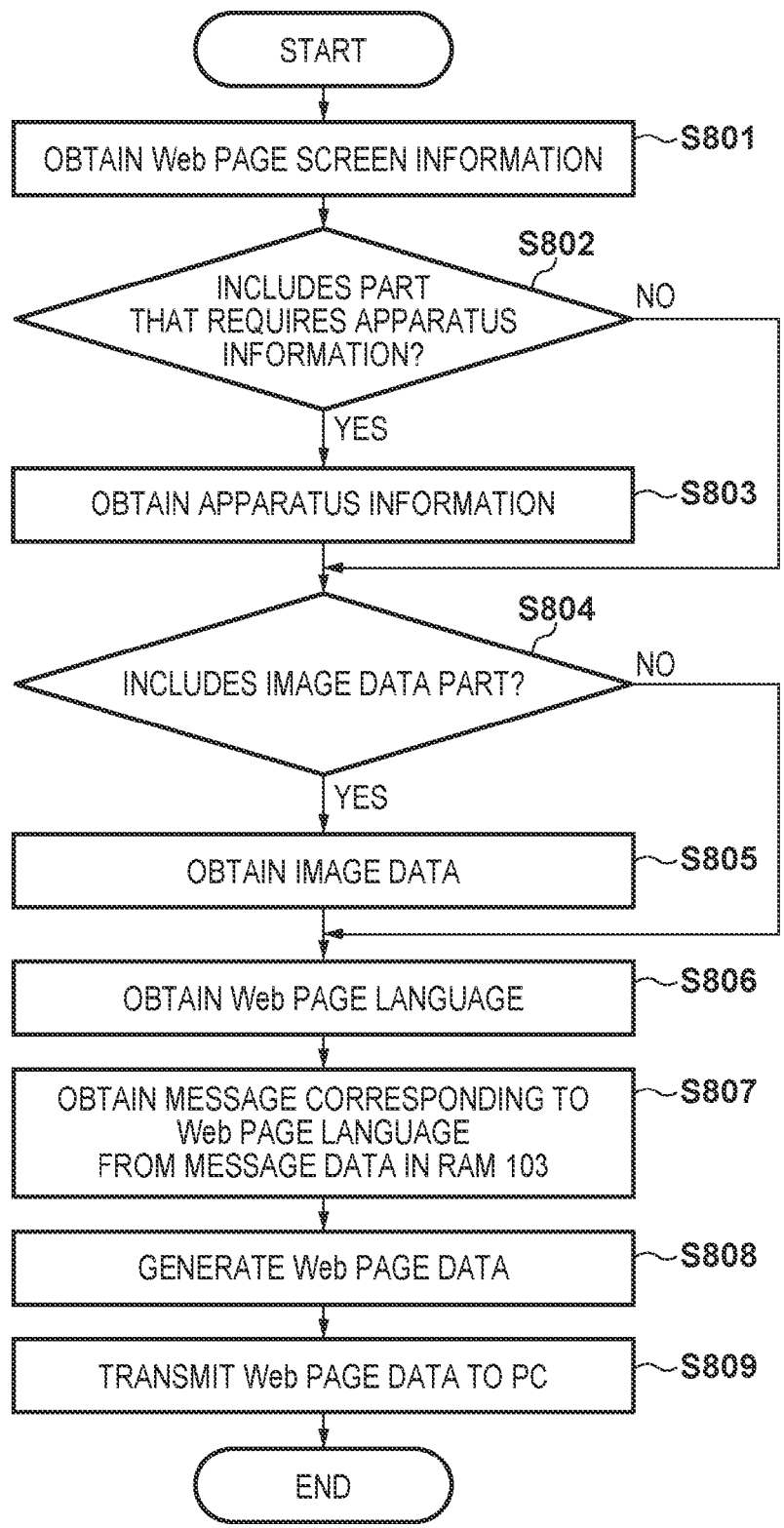
FIG. 8 is a flowchart for describing web page generation processing executed by the image forming apparatus according to the first embodiment.

FIG. 8 is a flowchart for describing web page generation processing executed by the image forming apparatus 100 according to the first embodiment. Note that a program for executing this processing is stored in the program area of the non-volatile memory 104 and is deployed into the RAM 103 at the time of execution, and the CPU 102 achieves the processing shown in this flowchart by executing the deployed program.

This processing is started in the case where the image processing apparatus 100 is accessed from the web browser of the PC 120, or in the case where a request for display of apparatus information such as the device status is received from the web browser of the PC 120. In step S801, in accordance with a request from the web browser of the PC 120, the CPU 102 obtains web page screen information that is stored in the program area of the non-volatile memory 104 of the image forming apparatus 100. For example, in the case where the log in screen was requested here, the web page screen information for a Screen 1 indicated by numeral 701 in FIG. 7 is obtained, and in the case where the device status screen was requested, web page screen information for a Screen 2 indicated by numeral 702 in FIG. 7 is obtained. Next, the procedure advances to step S802, in which the CPU 102 determines whether or not the web page screen information obtained in step S801 includes a part that requires apparatus information. Here, "a part that requires apparatus information" corresponds to "Printer:" and "Scanner:" in the device status screen shown in FIG. 6B. If it is determined that the part that requires apparatus information is included, the procedure advances to step S803, and the CPU 102 obtains apparatus information that is stored in the data area of the non-volatile memory 104 and the RAM 103. For example, in the case of displaying the device status screen shown in FIG. 6B, if the parts "Printer:" and "Scanner:" are included, the device statuses of the printer unit 107 and the reading unit 109 are obtained and stored as apparatus information in the RAM 103, and then the procedure advances to step S804. However, if it is determined in step S802 that the part that requires apparatus information is not included, the procedure advances to step S804.

In step S804, the CPU 102 determines whether or not the web page screen information includes an image data part. If it is determined that the image data part is included, the procedure advances to step S805, in which the CPU 102 obtains image data (not shown) that is stored in the data area of the non-volatile memory 104, and then the procedure advances to step S806. However, if the CPU 102 determines in step S804 that the image data part is not included, the procedure advances to step S806. In step S806, the CPU 102 obtains the language of the requested web page. Next, the procedure advances to step S807, in which the CPU 102 obtains the messages that correspond to the web page language from the message data that was developed to the RAM 103 when the power was turned on. Next, the procedure advances to step S808, in which the CPU 102 generates web page data for transmission to the PC 120 based on the obtained apparatus information, image data, messages, and the like. Next, the procedure advances to step S809, in which the CPU 102 transmits the web page data that was generated in step S808 to the PC 120, and then ends this processing.

Through the processing shown in this flowchart, when a display request is received from the PC 120, the image forming apparatus 100 can generate web page data using data that has been developed to the RAM in advance, and then transmit the web page data to the PC 120. Accordingly, the user of the PC 120 can display the log in screen and the device status screen in a language that corresponds to the shipping destination of the image forming apparatus 100.

As described above, according to the first embodiment, when the power of the image forming apparatus is turned on, compressed message data for multiple supported languages is obtained based on information indicating the place of destination of the image forming apparatus, and then the obtained message data is expanded and stored in the RAM. Accordingly, when a display request for a web page screen is received from a client, it is possible to swiftly generate a web page in a language that corresponds to the information indicating the place of destination and transmit the generated web page to the client.

Second Embodiment

Next, a second embodiment of the present invention will be described. The hardware configuration and the like of the image forming apparatus 100 according to the second embodiment are same as in FIG. 1 of the first embodiment described above, and thus will not be described. In the second embodiment, when the power of the image forming apparatus is turned on, compressed message data in the default language corresponding to the information indicating the place of destination of the image forming apparatus is obtained, expanded, and stored in the RAM. Then, when a web page display request is given to the image processing apparatus from a client, it is determined whether message data in the designated language is stored in the RAM, and, if it is stored in the RAM, web page data is generated using the message data. However, if message data in the designated language is not stored in the RAM, message data in that language is obtained from the non-volatile memory, expanded, and added to the RAM. This will be described in detail below.

Figure 9:
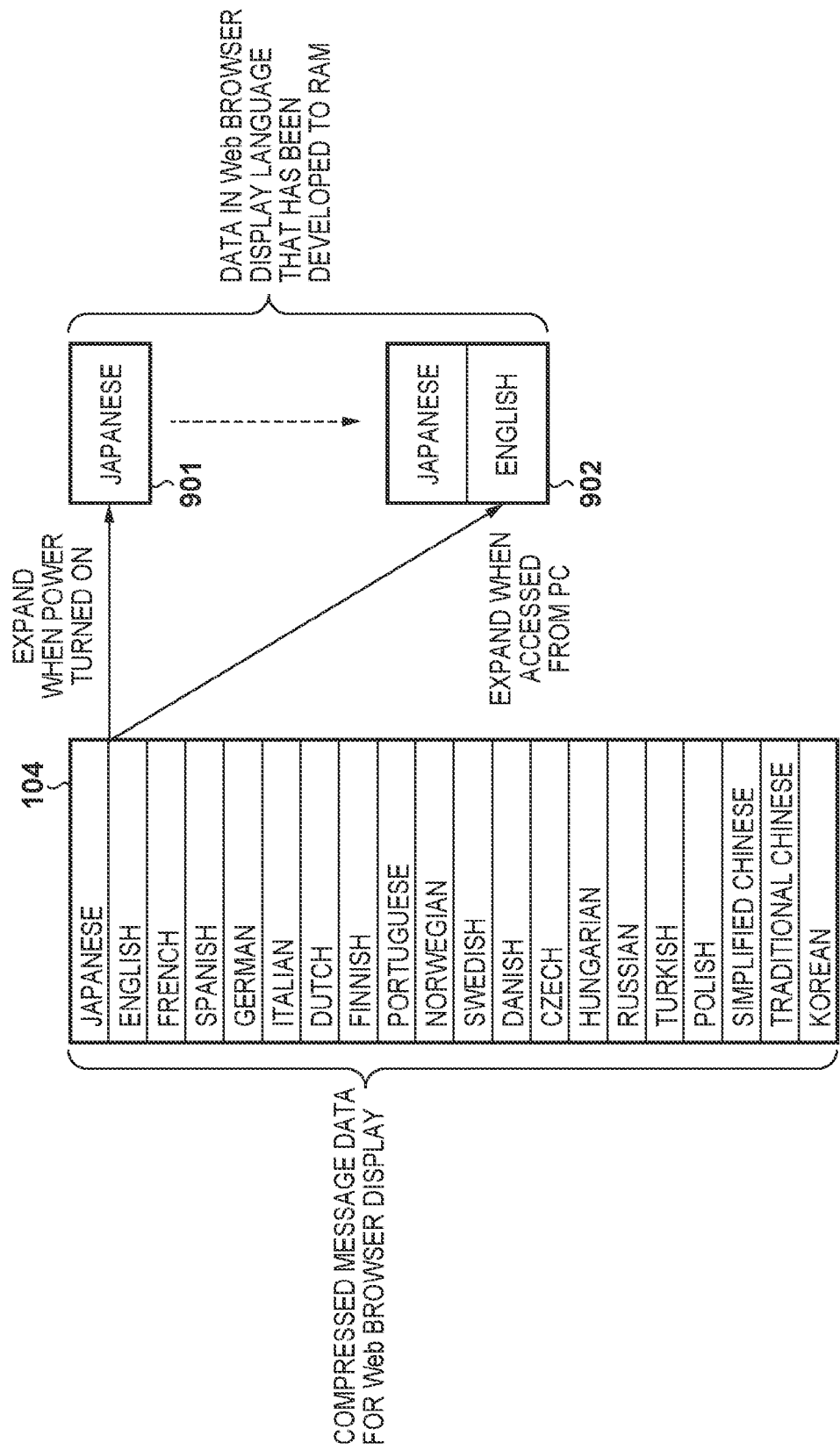
FIG. 9 is a diagram for describing the expansion of message data in web page data by an image forming apparatus according to a second embodiment of the present invention.

FIG. 9 is a diagram describing the expansion of message data in web page data by the image forming apparatus 100 according to the second embodiment of the present invention.

Message data for web browser display is stored in a compressed manner in the program area of the non-volatile memory 104. Numeral 901 denotes message data for web browser display that the CPU 102 reads out from the non-volatile memory 104, expands, and stores in the RAM 103 when the power of the image forming apparatus 100 is turned on. Here, when the power is turned on, in the case where the place of destination is Japan for example, message data in Japanese, which is the default language and is stored in a compressed manner in the non-volatile memory 104, is expanded and stored in the RAM 103.

Then, when the image forming apparatus 100 is accessed from the web browser of the PC 120, the language of the requested web page is obtained. The CPU 102 then determines whether or not message data in the requested web page language has been developed to the RAM 103. If the message data in the language has been developed, web page data is generated using the stored message data and then transmitted to the PC S120. On the other hand, in the case where the message data in the requested web page language has not been developed to the RAM 103, the CPU 102 reads out message data for the requested web page language, which is compressed in the program area of the non-volatile memory 104, and expands it. The expanded message data is then stored in (added to) the RAM 103. For example, in the example shown in FIG. 9, in the case where the place of destination is Japan, messages for display in English have not been developed to the RAM 103. For this reason, as indicated by numeral 902, English message data, which is compressed in the program area of the non-volatile memory 104, is read out and expanded, and the expanded message data is stored in (added to) the RAM 103.

Figure 10:
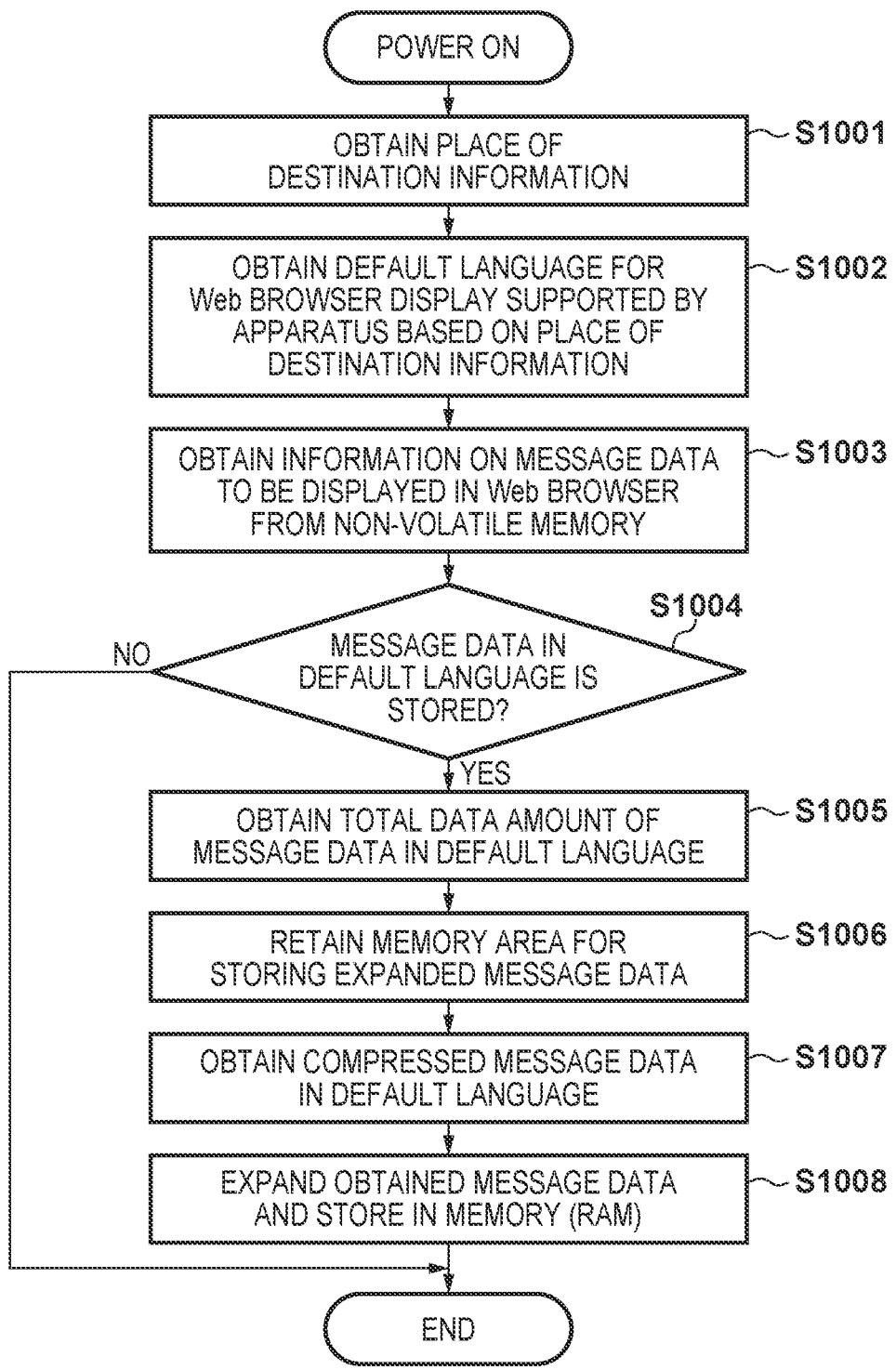

FIG. 10 is a flowchart for describing processing in which the image forming apparatus 100 according to the second embodiment of the present invention develops message data for web browser display to the RAM 103 when the power is turned on. Note that a program for executing this processing is stored in the program area of the non-volatile memory 104 and is deployed into the RAM 103 at the time of execution, and the CPU 102 achieves the processing shown in this flowchart by executing the deployed program.

This processing is started due to the power of the image forming apparatus 100 being turned on. First, in step S1001, the CPU 102 reads out and obtains destination information indicating the shipping destination of the image forming apparatus 100, which is stored in the data area of the non-volatile memory 104 of the image forming apparatus 100. Next, the procedure advances to step S1002, in which the CPU 102 obtains the default web browser language (FIG. 2) supported by an image forming apparatus that is shipped to the place of destination based on the obtained place of destination information. This default language is indicted by an asterisk mark in FIG. 2. For example, in the case where the place of destination information indicates Japan, Japanese, which is the default language supported by apparatuses destined for Japan, is obtained as shown in FIG. 2. Next, the procedure advances to step S1003, in which the CPU 102 obtains information regarding message data that corresponds to Japanese from the message data for web browser display that is stored in the program area of the non-volatile memory 104. The procedure then advances to step S1004, in which the CPU 102 determines whether or not message data in the default language (FIG. 3) is stored in the program area of the non-volatile memory 104. In the case of a determination that the message data is stored, the procedure advances to step S1005, whereas in the case of a determination that the message data is not stored, this processing is ended.

In step S1005, the CPU 102 obtains the total data amount of the message data in the default language. Next, the procedure advances to step S1006, in which, based on the total data amount, the CPU 102 retains a memory area for storing the expanded message data in the RAM 103. Next, the procedure advances to step S1007, in which the CPU 102 reads out and obtains message data in the default language, which is stored in a compressed manner in the program area of the non-volatile memory 104. The procedure then advances to step S1008, in which the CPU 102 expands the obtained message data and stores it in the memory area retained in the RAM 103, and then ends this processing.

Through the processing shown in this flowchart, when the power of the image forming apparatus 100 is turned on, message data in the default web browser language that corresponds to the shipping destination of the image forming apparatus 100 is developed and stored to the RAM 103. Accordingly, even when a web page display request is received from a client, it is possible to swiftly generate web page data and transmit it to the client.

Figure 11:
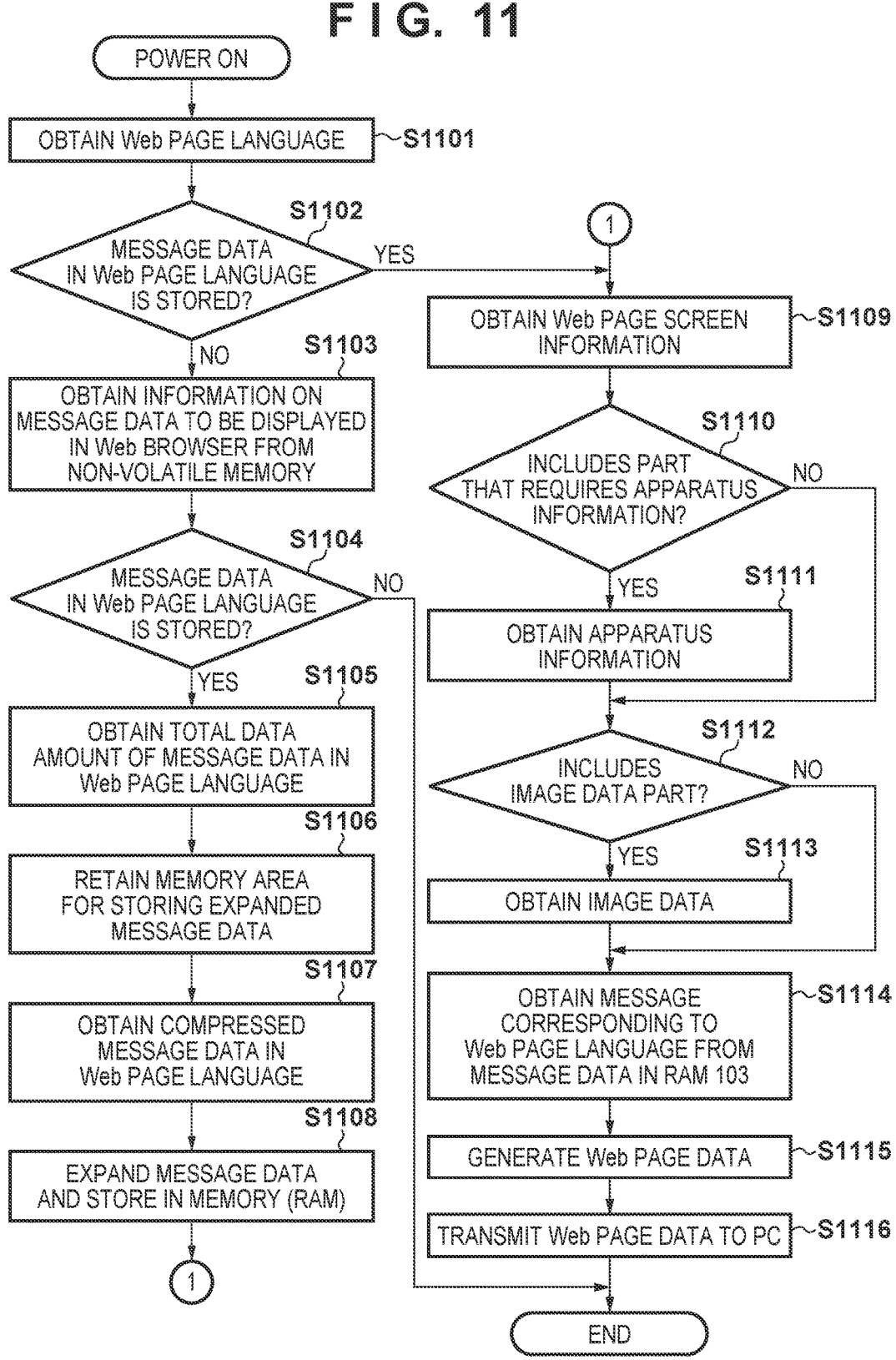
FIG. 11 is a flowchart for describing web page generation processing executed by the image forming apparatus according to the second embodiment.

FIG. 11 is a flowchart for describing web page generation processing executed by the image forming apparatus 100 according to the second embodiment. Note that a program for executing this processing is stored in the program area of the non-volatile memory 104 and is deployed into the RAM 103 at the time of execution, and the CPU 102 achieves the processing shown in this flowchart by executing the deployed program.

This processing is started in the case where the image processing apparatus 100 is accessed from the web browser of the PC 120, or in the case where a request for display of apparatus information such as the device status is received from the web browser of the PC 120. First, in step S1101, the CPU 102 obtains the language of the requested web page, and then advances the procedure to step S1102. In step S1102, the CPU 102 determines whether or not the message data in the requested web page language has been developed to the RAM 103. Here, if it is determined that such message data has been developed to the RAM 103, the procedure advances to step S1109. The processing of steps S1109 to S1116 is the same as the previously described processing of steps S801 to S805 and steps S807 to S809 in FIG. 8, and thus will not be described.

If the CPU 102 determines in step S1102 that the message data in the requested web page language has not been developed to the RAM 103, the procedure advances to step S1103. In step S1103, the CPU 102 obtains information regarding message data for web browser display that is stored in the program area of the non-volatile memory 104. Next, the procedure advances to step S1104, in which the CPU 102 determines whether or not the message data in the requested web page language is stored in the program area of the non-volatile memory 104, advances the procedure to step S1105 if such message data is stored, and ends this processing if such message data is not stored. In step S1105, the CPU 102 obtains the total data amount of the message data in the request web page language. Next, the procedure advances to step S1106, in which the CPU 102 retains a memory area for storing the expanded message data in the RAM 103. Next, the procedure advances to step S1107, in which the CPU 102 obtains the message data in the requested web page language, which is stored in a compressed manner in the program area of the non-volatile memory 104. The procedure then advances to step S1108, in which the CPU 102 expands the message data that was obtained in step S1107, stores the expanded message data in the memory area that was retained in the RAM 103 in step S1106, and then advances the procedure to step S1109.

As described above, according to the second embodiment, when the power of the image forming apparatus is turned on, based on information indicating the place of destination of the image forming apparatus, message data in the default language is expanded and stored in the RAM. Accordingly, when a web browser display request is given to the image processing apparatus from a client, it is possible to swiftly generate corresponding display data and provide it to the client.

Also, when a web browser display request is given to the image processing apparatus from a client, if message data in the designated language has not been developed to the RAM, compressed message data for the designated language is expanded and stored in the RAM. Accordingly, even if requests to generate web pages in multiple languages are received from clients, it is possible to provide web pages that correspond to the requested languages.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-208290, filed Oct. 22, 2015 which is hereby incorporated by reference herein in its entirety.

What is claimed is:

1. An information processing apparatus capable of providing Web page data including contents corresponding to a plurality of languages to an external apparatus that is separate from the information processing apparatus, the information processing apparatus comprising:
a first memory device that stores compressed contents corresponding to the plurality of languages;
a second memory device that is able to store data; and
at least one processor that executes instructions stored in a memory to function as:
a unit that, in a case that web page data corresponding to a specified language is requested by the external apparatus, (i) if a content of the web page data corresponding to the specified language is decompressed and stored in the second memory device, generates the web page data including the decompressed content stored in the second memory device, and (ii) if the decompressed content of the web page data corresponding to the specified language is not stored in the second memory device, decompresses the content of the web page data corresponding to the specified language based on the compressed content of the web page data corresponding to the specified language and stores the decompressed content in the second memory device to generate the web page data including the decompressed content stored in the second memory;
a unit that, in accordance with the information processing apparatus being turned on, obtains information related to a region of the world, and
a unit that, in accordance with having obtained information indicating a first region as the information, stores a plurality of items of decompressed contents corresponding to some of the plurality of languages in the second memory device, wherein the plurality of items of decompressed contents include first decompressed content of a first language and second decompressed content of a second language, and, in accordance with having obtained information indicating a second region as the information, stores in advance a plurality of items of decompressed contents corresponding to some of the plurality of languages in the second memory device, wherein the plurality of items of decompressed contents include third decompressed content of a third language and fourth decompressed content of a fourth language,
wherein a number of the plurality of items of decompressed contents is different from each other in a case that the information indicating the first region is obtained and in a case that the information indicating the second region is obtained.

2. The information processing apparatus according to claim 1, wherein the first memory device is a non-volatile memory, and the second memory device is a volatile memory that is able to be accessed at a higher speed than the first memory device is able to be accessed.

3. The information processing apparatus according to claim 1, wherein the information related to the region in the world is a shipping destination of the information processing apparatus.

4. The image forming apparatus according to claim 1, wherein the at least one processor executes the instructions to further transmit the generated web page data to the external apparatus in accordance with a request from the external apparatus.

5. The information processing apparatus according to claim 1, wherein the at least one processor executes the instructions to further store, in accordance with having obtained information indicating a specified region as the information, decompressed content of Japanese language and decompressed content of English language in the second memory device.

6. The information processing apparatus according to claim 1, wherein the at least one processor executes the instructions to further store, in accordance with having obtained information indicating a specified region as the information, decompressed contents of English language, French language, Spanish language and Portuguese language in the second memory device.

7. The information processing apparatus according to claim 1, wherein the at least one processor executes the instructions to further store, in accordance with having obtained information indicating a specified region as the information, decompressed contents of English language, French language, Spanish language, German language, Italian language, Dutch language, Finnish language, Portuguese language, Norwegian language, Swedish language, Danish language, Czech language, Hungarian language, Russian language, Polish language and Turkish language in the second memory device.

8. The information processing apparatus according to claim 1, wherein the at least one processor executes the instructions to further store, in accordance with having obtained information indicating a specified region as the information, decompressed contents of English language, French language, Spanish language, Japanese language, Simplified Chinese language, traditional Chinese language, and Korean language in the second memory device.

9. The information processing apparatus according to claim 1, wherein the at least one processor executes the instructions to further store, in accordance with having obtained information indicating a specified region as the information, decompressed contents of English language, Japanese language, Simplified Chinese language, traditional Chinese language, and Korean language in the second memory device.

10. The information processing apparatus according to claim 1, wherein the at least one processor executes the instructions to further store, in accordance with having obtained information indicating a specified region as the information, decompressed contents of English language and Korean language in the second memory device.

11. A method of controlling an information processing apparatus having a first memory device that stores compressed contents corresponding to a plurality of languages and a second memory device that is able to store data, that is able to provide Web page data including contents corresponding to a plurality of languages to an external apparatus that is separate from the information processing apparatus, the method comprising:
in a case that web page data corresponding to a specified language is requested by the external apparatus, (i) if a content of the web page data corresponding to the specified language is decompressed and stored in the second memory device, generating the web page data including the decompressed content stored in the second memory device;
(ii) if the decompressed content of the web page data corresponding to the specified language is not stored in the second memory device, decompressing the content of the web page data corresponding to the specified language based on the compressed content of the web page data corresponding to the specified language and storing the decompressed content in the second memory device to generate the web page data including the decompressed content stored in the second memory;
obtaining information related to a region in the world in accordance with the information processing apparatus being turned on;
in accordance with having obtained information indicating a first region as the information, storing a plurality of items of decompressed contents corresponding to some of the plurality of languages in the second memory device, wherein the plurality of items of decompressed contents include first decompressed content of a first language and second decompressed content of a second language; and
in accordance with having obtained information indicating a second region as the information, storing in advance a plurality of items of decompressed contents corresponding to some of the plurality of languages in the second memory device, wherein the plurality of items of decompressed contents include third decompressed content of a third language and fourth decompressed content of a fourth language,
wherein a number of the plurality of items of decompressed contents is different from each other in a case that the information indicating the first region is obtained and in a case that the information indicating the second region is obtained.

12. The method according to claim 11, wherein the first memory device is a non-volatile memory, and the second memory device is a volatile memory that is able to be accessed at a higher speed than the first memory device is able to be accessed.

13. The method according to claim 11, wherein the information related to the region in the world is a shipping destination of the information processing apparatus.

14. The method according to claim 11, further comprising: transmitting the generated web page data to the external apparatus in accordance with a request from the external apparatus.

15. The method according to claim 11, further comprising: storing, in accordance with having obtained information indicating a specified region as the information, decompressed content of Japanese language and decompressed content of English language in the second memory device.

16. The method according to claim 11, further comprising: storing, in a specified state, storing, in accordance with having obtained information indicating a specified region as the information, decompressed contents of English language, French language, Spanish language and Portuguese language in the second memory device.

17. The method according to claim 11, further comprising: storing, in accordance with having obtained information indicating a specified region as the information, decompressed contents of English language, French language, Spanish language, German language, Italian language, Dutch language, Finnish language, Portuguese language, Norwegian language, Swedish language, Danish language, Czech language, Hungarian language, Russian language, Polish language and Turkish language in the second memory device.

18. The method according to claim 11, further comprising: storing, in accordance with having obtained information indicating a specified region as the information, decompressed contents of English language, French language, Spanish language, Japanese language, Simplified Chinese language, traditional Chinese language, and Korean language in the second memory device.

19. The method according to claim 11, further comprising: storing, in accordance with having obtained information indicating a specified region as the information, decompressed contents of English language, Japanese language, Simplified Chinese language, traditional Chinese language, and Korean language in the second memory device.

20. The method according to claim 11, further comprising: storing, in accordance with having obtained information indicating a specified region as the information, decompressed contents of English language and Korean language in the second memory device.

* * * * *